(12) United States Patent
Lee et al.

(10) Patent No.: US 11,133,917 B2
(45) Date of Patent: Sep. 28, 2021

(54) APPARATUS AND METHOD FOR SAMPLING SIGNAL IN WIRELESS COMMUNICATION SYSTEM THAT EMPLOYS TIME DIVISION DUPLEX SCHEME

(71) Applicant: Samsung Electronics Co., Ltd., Suwon-si (KR)

(72) Inventors: Minchan Lee, Seoul (KR); Hyeongrae Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/627,175

(22) PCT Filed: Jul. 4, 2018

(86) PCT No.: PCT/KR2018/007558
§ 371 (c)(1),
(2) Date: Dec. 27, 2019

(87) PCT Pub. No.: WO2019/022401
PCT Pub. Date: Jan. 31, 2019

(65) Prior Publication Data
US 2020/0162231 A1 May 21, 2020

(30) Foreign Application Priority Data
Jul. 25, 2017 (KR) .................. 10-2017-0093989

(51) Int. Cl.
*H04L 5/14* (2006.01)
*H04J 3/06* (2006.01)
(Continued)

(52) U.S. Cl.
CPC .......... *H04L 5/1469* (2013.01); *H04J 3/0617* (2013.01); *H04L 1/0025* (2013.01); *H04L 27/2607* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 5,987,010 | A | 11/1999 | Schnizlein |
| 7,209,494 | B1 | 4/2007 | Griffin et al. |
| (Continued) | | | |

FOREIGN PATENT DOCUMENTS

| | | |
|---|---|---|
| CN | 1615667 A | 5/2005 |
| CN | 102648599 A | 8/2012 |
| (Continued) | | |

OTHER PUBLICATIONS

Extended European Search Report dated Jun. 16, 2020, issued in European Application No. 18837200.7.
(Continued)

*Primary Examiner* — Scott M Sciacca
(74) *Attorney, Agent, or Firm* — Jefferson IP Law, LLP

(57) ABSTRACT

An apparatus and a method for sampling a signal in a wireless communication system that employs a time division duplex (TDD) scheme are provided. According to various embodiments of the present disclosure, a method for a base station being operated in a wireless communication system that employs TDD comprises the steps of: determining a switching section for controlling a conversion mode of a sampling rate conversion circuit based on a timing advance (TA) value with respect to a signal transmitted by a terminal; generating a switching signal within the switching section; changing the conversion mode from a first mode to second mode in response to the switching signal; and changing a
(Continued)

sampling rate of a transmission signal or reception signal based on the second mode. As a result, the transmission signal and the reception signal can be prevented from overlapping in the sampling rate conversion circuit that can perform both of up conversion and down conversion, and hardware resources for changing a sampling rate of a signal can be reduced.

14 Claims, 12 Drawing Sheets

(51) Int. Cl.
*H04W 56/00* (2009.01)
*H04L 1/00* (2006.01)
*H04L 27/26* (2006.01)

(56) References Cited

U.S. PATENT DOCUMENTS

| 2005/0111369 | A1 | 5/2005 | Mangin et al. |
| 2006/0035618 | A1* | 2/2006 | Pleasant ............... H04B 1/0096 455/323 |
| 2006/0052076 | A1 | 3/2006 | Rumsey |
| 2008/0171520 | A1 | 7/2008 | Steer |
| 2009/0219875 | A1 | 9/2009 | Kwak et al. |
| 2010/0309827 | A1 | 12/2010 | Choi |
| 2010/0322321 | A1 | 12/2010 | Kasher et al. |
| 2013/0136038 | A1* | 5/2013 | Spagnolini ............ H04L 5/005 370/280 |
| 2013/0250772 | A1 | 9/2013 | Yin |
| 2013/0336302 | A1* | 12/2013 | Lee ....................... H04L 5/0096 370/336 |
| 2014/0098721 | A1 | 4/2014 | Chen et al. |
| 2014/0233410 | A1 | 8/2014 | Mikami et al. |
| 2015/0124662 | A1* | 5/2015 | Babitch ................ H04L 5/1461 370/278 |
| 2015/0334707 | A1 | 11/2015 | Rajagopalan et al. |
| 2015/0358930 | A1 | 12/2015 | Navalekar et al. |
| 2016/0099799 | A1 | 4/2016 | Bashar et al. |
| 2016/0156454 | A1 | 6/2016 | Khoryaev et al. |
| 2016/0174245 | A1 | 6/2016 | Guo et al. |
| 2019/0373560 | A1* | 12/2019 | Ouchi ................ H04W 72/042 |

FOREIGN PATENT DOCUMENTS

| CN | 101146314 B | 9/2012 |
| CN | 103929388 A | 7/2014 |
| KR | 10-2001-0022190 A | 3/2001 |
| KR | 10-0590486 B1 | 6/2006 |
| KR | 10-0621887 B1 | 9/2006 |
| KR | 10-2009-0021674 A | 3/2009 |
| KR | 10-2009-0075601 A | 7/2009 |
| KR | 10-1457558 B1 | 11/2014 |
| WO | 2011/071944 A1 | 6/2011 |

OTHER PUBLICATIONS

Chinese Office Action dated Feb. 2, 2021, issued in Chinese Application No. 201880049394.6.
Indian Office Action dated Mar. 19, 2021, issued in Indian Application No. 202037006670.
Korean Office Action dated Jul. 30, 2021, issued in Korean Application No. 10-2017-0093989.

* cited by examiner

APPARATUS AND METHOD FOR SAMPLING SIGNAL IN WIRELESS COMMUNICATION SYSTEM THAT EMPLOYS TIME DIVISION DUPLEX SCHEME

TECHNICAL FIELD

The disclosure generally relates to a wireless communication system and, more particularly, to an apparatus and a method for sampling signals in a wireless communication system employing a time division duplex (TDD) scheme.

BACKGROUND ART

In a wireless communication system, a base station may up-convert a signal, and may transmit the up-converted signal to a terminal. A transmission device transmits an up-converted signal, so that a low-complexity analog filter for removing images may be used, and the transmission device may have effects of improving a signal power-to-noise power ratio (SNR) and improving the frequency response of a wideband signal as a processing gain increases. In recent years, wider carrier bandwidths, the use of multiple carriers, and the use of high-power amplifiers have made it necessary to process signals having higher sampling rates.

As described above, an up-converter is required in order for the base station to up-convert a transmission signal. On the other hand, in the case where the base station receives a signal from the terminal, a down-converter is required in order for the base station to down-convert the received signal. Since transmission and reception of signals do not occur simultaneously in a wireless communication system employing a time division duplex (TDD) scheme, only one of the up-converter and the down-converter of the base station may be used, and the remaining one may not be used.

DISCLOSURE OF INVENTION

Technical Problem

Based on the discussion as described above, the disclosure provides an apparatus and a method for sampling a signal in a wireless communication system employing a time division duplex (TDD) scheme.

In addition, various embodiments of the disclosure provide an apparatus including a sampling rate conversion circuit capable of performing both up-conversion and down-conversion of a signal and a method of operating the same.

In addition, various embodiments of the disclosure provide an apparatus for controlling a conversion mode of a sampling rate conversion circuit according to a switching signal and a method of operating the same.

In addition, various embodiments of the disclosure provide an apparatus for determining a switching period in which a switching signal is generated and a method of operating the same.

Further, various embodiments of the disclosure provide an apparatus for determining a switching period, based on a timing advance (TA) value with respect to a signal transmitted from a terminal, and a method of operating the same.

Solution to Problem

According to various embodiments of the disclosure, a method of operating a base station in a wireless communication system employing a time division duplex (TDD) scheme may include: determining a switching period for controlling a conversion mode of a sampling rate conversion circuit, based on a timing advance (TA) value with respect to a signal transmitted from a terminal; generating a switching signal within the switching period; switching the conversion mode from a first mode to a second mode in response to the switching signal; and, based on the second mode, changing a sampling rate of a transmission signal or a reception signal.

According to various embodiments of the disclosure, an apparatus of a base station in a wireless communication system employing TDD may include a controller including a sampling rate conversion circuit. The controller may be configured to determine a switching period for controlling a conversion mode of the sampling rate conversion circuit, based on a timing advance (TA) value with respect to a signal transmitted from a terminal, generate a switching signal within the switching period, switch the conversion mode from a first mode to a second mode in response to the switching signal, and change a sampling rate of a transmission signal or a reception signal, based on the second mode.

Advantageous Effects of Invention

An apparatus and a method according to various embodiments of the disclosure may control a conversion mode of a sampling rate conversion circuit capable of performing both up-conversion and down-conversion in an appropriate switching period, thereby preventing a transmission signal and a reception signal from overlapping and reducing hardware resources for changing a sampling rate of a signal.

The effects obtained from the disclosure are not limited to the above-mentioned effects, and other effects not mentioned above may be clearly understood by those skilled in the art from the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure describes an apparatus and a method for sampling a signal in a wireless communication system. The sampling of the signal may include up-conversion to increase the sampling rate of a signal and down-conversion to decrease the sampling rate of a signal.

Terms referring to control information, terms referring to network entities, terms referring to control information or messages, terms referring to components of an apparatus, and the like, which are used hereinafter, are illustrative words for the convenience of explanation. Accordingly, the disclosure is not limited to the terms described below, and other terms having equivalent technical meanings may be used.

In addition, the disclosure will describe various embodiments using terms used in some communication standards (e.g., 3rd generation partnership project (3GPP)), but this is merely an illustrative example. The various embodiments of the disclosure may be easily modified and applied to other communication systems as well.

Figure 1:
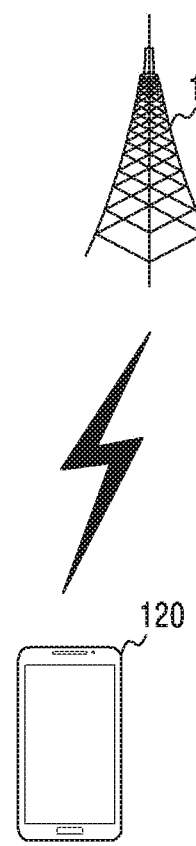
FIG. 1 illustrates a wireless communication system according to various embodiments of the disclosure.

FIG. 1 illustrates a wireless communication system 100 according to various embodiments of the disclosure. The wireless communication system 100 may include a base station 110 and a terminal 120. According to various embodiments of the disclosure, the wireless communication system 100 may employ a time division duplex (TDD) scheme.

Referring to FIG. 1, the base station 110 may transmit a signal to the terminal 120. In other words, the terminal 120 may receive a signal from the base station 110. The base station 110 may up-convert a transmission signal (i.e., a downlink signal), and may transmit the up-converted signal to the terminal 120. On the other hand, the base station 110 may receive a signal (i.e., an uplink signal) up-converted by the terminal 120, and may down-convert the received signal. Similarly, like the base station 110, the terminal 120 may also perform up-conversion and/or down-conversion of a signal. Hereinafter, in this document, "up-converting" denotes an operation of increasing the sampling rate of a signal, and "down-converting" denotes an operation of decreasing the sampling rate of a signal.

The base station 110 is a network element (NE) that provides wireless access to a terminal. The base station 110 may be referred to as an "access point (AP)", an "eNodeB (eNB)", a "5th generation (5G) node", a "5G NodeB (NB)", a "wireless point", a "transmission/reception point (TRP)", or other terms having equivalent technical meanings.

The terminal 120 is a device used by a user, and communicates with the base station via wireless channels. The terminal 120 may be referred to as "user equipment (UE)", a "mobile station", a "subscriber station", a "remote terminal", a "wireless terminal", an "electronic device", a "user device", or other terms having equivalent technical meanings.

The base station 110 and the terminal 120 may include a plurality of antennas. For example, the base station 110 may include Nt transmission antennas, and the terminal 120 may include Nr reception antennas. According to various embodiments of the disclosure, a system in which the base station 110 transmits signals through a plurality of transmission antennas and the terminal 120 receives signals through a plurality of reception antennas may be referred to as a "multiple-input multiple-output (MIMO) system" or, simply, a "MIMO". In FIG. 1, although the base station 110 and the terminal 120 are illustrated as including a plurality of antennas, this is an illustrative example, and the base station 110 and the terminal 120 may include a single antenna (Nt=1, 2, 3, . . . and Nr=1, 2, 3, . . . )

Hereinafter, an apparatus for up-converting a transmission signal or down-converting a reception signal for the base station 110 to communicate with a transmission device 120 and an operation method thereof will be described with reference to FIGS. 2 to 11.

Figure 2:
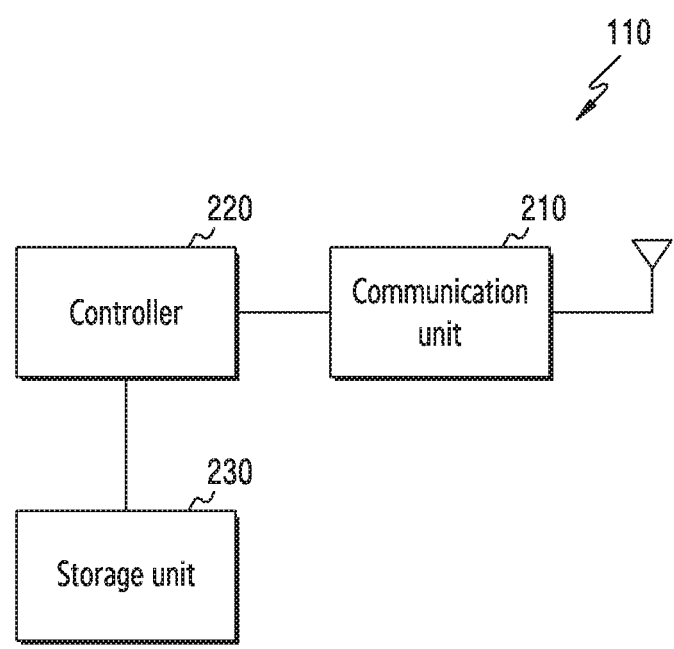
FIG. 2 illustrates the configuration of a base station in a wireless communication system according to various embodiments of the disclosure.

FIG. 2 illustrates the configuration of a base station 110 in a wireless communication system according to various embodiments of the disclosure. Hereinafter, the term "-unit", "-or (er)", or the like denotes a unit for processing at least one function or operation, and may be implemented as hardware, software, or a combination thereof. The configuration of the base station 110 illustrated in FIG. 2 may include a configuration by which the base station 110 receives a signal from the terminal 120, as well as a configuration by which the base station 110 transmits a signal to the terminal 120.

Referring to FIG. 2, the base station 110 may include a communication unit 210, a controller 220, and a storage unit 230.

The communication unit 210 may perform functions of transmitting and receiving signals via a wireless channel. For example, the communication unit 210 may perform a function of transformation between a baseband signal and a bit sequence according to the physical layer standard of a system. For example, in the case of transmitting control information, the communication unit 210 may generate modulation symbols by encoding and modulating a transmission bit sequence. In the case of receiving data, the communication unit 210 may restore a reception bit sequence by demodulating and decoding a baseband signal. In addition, the communication unit 210 may up-convert a baseband signal to a radio frequency (RF) band signal, thereby transmitting the same through an antenna, and may down-convert an RF band signal received through the antenna to a baseband signal. According to an embodiment, the communication unit 210 may up-convert a transmission signal, and may down-convert a reception signal. For example, the communication unit 210 may include a decoder, a demodulator, an analog-to-digital convertor (ADC), a reception filter, an amplifier, a mixer, an oscillator, and the like. In addition, in the case of transmitting signals, the communication unit 210 may further include an encoder, a modulator, a digital-to-analog convertor (DAC), a transmission filter, and the like.

The communication unit 210 may include one or more antennas. The communication unit 210 may receive a plurality of streams through the respective ones of the one or more antennas. In addition, the communication unit 210 may include a plurality of RF chains. In addition, the communication unit 210 may perform beamforming. For beamforming, the communication unit 210 may adjust the phase and magnitude of each of the signals transmitted and received through a plurality of antennas or antenna elements, thereby performing analog beamforming. Alternatively, the communication unit 210 may perform beamforming on a digital signal, that is, digital beamforming. In terms of hardware, the communication unit 210 may be comprised of a digital unit and an analog unit, and the analog unit may be comprised of a plurality of subunits according to operation power, operation frequency, and the like.

The communication unit 210 transmits and receives signals as described above. Accordingly, the whole or a part of the communication unit 210 may be referred to as a "transmitter", a "receiver", or a "transceiver". In the following description, transmission and reception performed via a wireless channel will be understood to encompass the execution of the process described above by the communication unit 210. In addition, according to an embodiment, the communication unit 210 may further include a backhaul communication unit that provides an interface for communication with a backhaul network.

The controller 220 controls the overall operation of the base station 110. For example, the controller 220 may transmit and receive signals via the communication unit 210. The controller 220 may write or read data to or from the storage unit 230. In addition, the controller 220 may perform the functions of a protocol stack required for the communication standard. To this end, the controller 220 may include at least one processor or a micro-processor, or may be configured as a part of a processor. According to various embodiments, the controller 220 may include a sampling rate conversion circuit capable of operating in a plurality of conversion modes. The controller 220 may determine a switching period for controlling a conversion mode of the sampling rate conversion circuit, based on a timing advance (TA) value with respect to a signal transmitted from the terminal, may generate a switching signal within the switching period, and may switch the conversion mode of the sampling rate conversion circuit in response to the switching signal.

The storage unit 230 may store data such as fundamental programs, application programs, and configuration information for the operation of the base station 110. The storage unit 230 may be configured as a volatile memory, a non-volatile memory, or a combination thereof. In addition, the storage unit 230 provides the stored data upon request by the controller 220.

In a wireless communication system employing a frequency division duplex (FDD) scheme, transmission and reception of signals by the base station 110 may be simultaneously performed in different frequency bands. In this case, in order for the base station 110 to simultaneously perform up-conversion of a transmission signal and down-conversion of a reception signal, both an up-converter performing the up-conversion and a down-converter performing the down-conversion may be required.

On the other hand, in a wireless communication system employing TDD, transmission and reception of signals by the base station 110 are performed at different times. In other words, since the transmission of a signal and the reception of a signal are not performed at the same time by the base station 110, only one of up-conversion and down-conversion is performed at a specific time. Therefore, if the up-converter and the down-converter are separately implemented in the base station 110 in a wireless communication system employing TDD, only one of the up-converter and the down-converter is used at a specific time while the remaining one is in an idle state. For example, since the base station 110 only transmits a signal, instead of receiving a signal, in a downlink period, the down-converter for down-converting a received signal is in an idle state. As another example, since the base station 110 only receives a signal, instead of transmitting a signal, in an uplink period, the up-converter for up-converting a transmission signal is in an idle state.

As described above, in the case where the up-converter and the down-converter are separately implemented in the base station 110 in the TDD system, one of the up-converter and the down-converter is in an idle state, which may cause inefficiency in terms of the use of hardware (HW) resources in the base station. If the amount of data to be processed by the base station 110 increases, the amount of HW resources required for the base station 110 also increases. Therefore, the inefficiency in the use of HW resources may cause problems such as a reduction in a data processing speed and an increase in power consumption.

Accordingly, various embodiments of the disclosure provide a sampling rate conversion circuit (or a sampling rate conversion unit) capable of performing both up-conversion and down-conversion in order to solve the inefficiency caused by separate implementations of the up-converter and the down-converter. The sampling rate conversion circuit may operate in one of an "up-conversion mode" for up-converting a transmission signal and a "down-conversion mode" for down-converting a reception signal, and switching from one mode to the other mode may be performed by a switching signal, which is a control signal. The switching signal may be generated and provided in an appropriate switching period such that a conversion mode of the sampling rate conversion circuit is changed in response to the change in the transmission/reception direction of a signal. The transmission/reception direction of a signal may include a transmission direction in which the base station transmits a signal and a reception direction in which the base station receives a signal.

Various embodiments of the disclosure may be applied to a wireless communication system employing TDD. In other words, various embodiments of the disclosure may be applied to any communication system employing TDD, as well as a 4th generation (4G) long-term evolution (LTE) system and/or a 5th generation (5G) new radio (NR) system.

Hereinafter, the structure of a sampling rate conversion circuit and a method of operating the same will be provided with reference to FIGS. 3 to 10.

Figure 3:
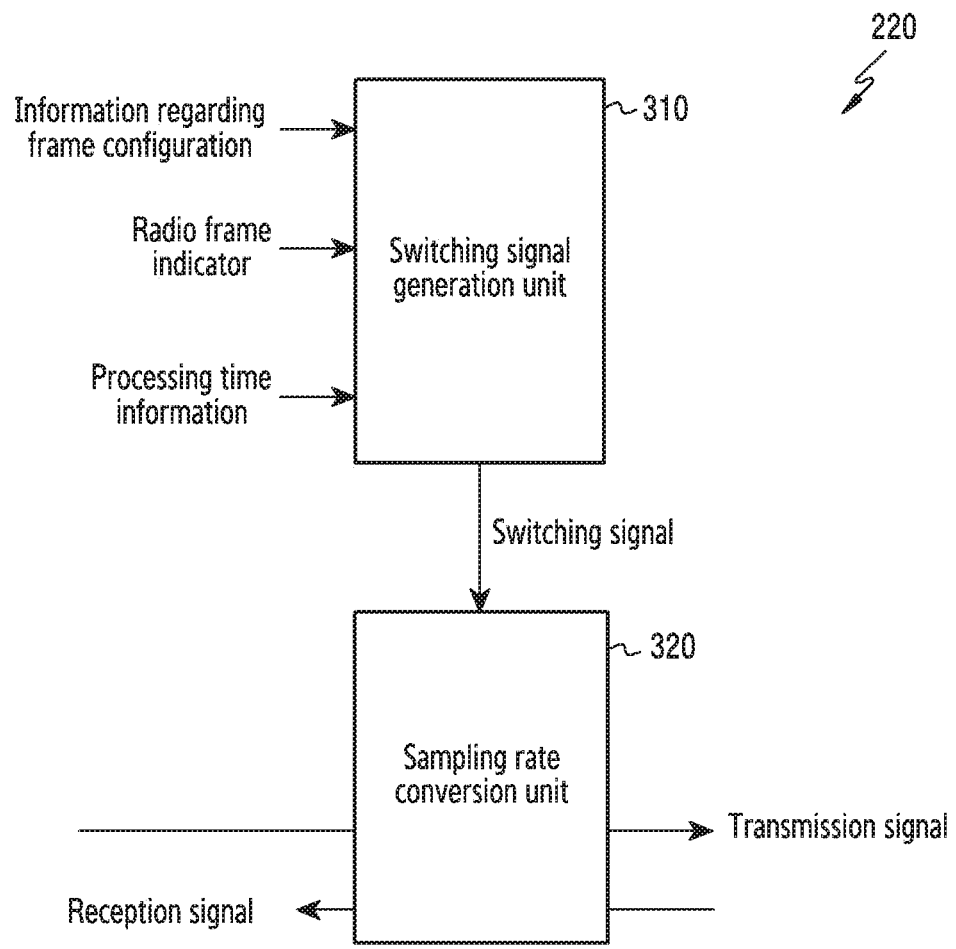
FIG. 3 illustrates the detailed configuration of a base station for switching a conversion mode of a sampling rate in a wireless communication system according to various embodiments of the disclosure.

FIG. 3 illustrates the detailed configuration of a base station for switching a conversion mode of a sampling rate in a wireless communication system according to various embodiments of the disclosure. Hereinafter, the term "-unit", "-or (er)", or the like denotes a unit for processing at least one function or operation, and may be implemented as hardware, software, or a combination thereof.

Referring to FIG. 3, the controller 220 may include a switching signal generation unit 310 and a sampling rate conversion unit 320. According to various embodiments of the disclosure, the sampling rate conversion circuit may refer to a configuration including the switching signal generation unit 310 and the sampling rate conversion unit 320, or may refer only to the sampling rate conversion unit 320.

The switching signal generation unit 310 may generate a switching signal for switching a conversion mode of the sampling rate conversion unit 320. In order to generate the switching signal, the switching signal generation unit 310 may determine a switching period, based on at least one of information on a frame configuration, a radio frame indicator, and processing time information. The switching period means a time period during which a switching signal for switching the conversion mode of the sampling rate conversion unit 320 is to be generated.

The information on the frame configuration may include information on a length (this means a temporal length) and arrangement of each of a downlink transmission period, a guard period (GP), and an uplink transmission period, which are included in the frame. The downlink transmission period is a period during which the base station 110 transmits a signal to the terminal 120 in the frame, and may include a downlink pilot time slot (DwPTS) of a special subframe (SSF). The uplink transmission period is a period during which the base station 110 receives a signal from the terminal 120 in the frame, and may include an uplink pilot time slot (UpPTS) of the SSF. The GP is provided between the end point of a downlink transmission period and the starting point of a subsequent uplink transmission period in the frame, and denotes a time period required for the transmission/reception direction of a signal to be changed (that is, from transmission to reception). On the other hand, the GP may not be provided between the end point of an uplink transmission period and the starting point of a subsequent downlink transmission period. In this case, the end of the uplink transmission period may match the starting point of the subsequent downlink transmission period. According to various embodiments of the disclosure, the frame may include a plurality of uplink transmission periods and a plurality of downlink transmission periods. The information on the arrangement of each period may indicate the sequence and/or position of each period in the frame. For example, the information on the arrangement may indicate that each period is located in the order of "downlink transmission period→GP→uplink transmission period→downlink transmission period" in the frame as time passes.

The radio frame indicator may indicate the starting time of the frame. The starting points and the end points of the downlink transmission period, the GP, and the uplink transmission period may be determined, based on the information on the starting time of the frame and the information on the frame configuration. In addition, the time for a specific position in the frame may be determined based on the starting point of the frame and the information on the frame configuration. Since the starting point and/or the end point of each period is related to the time at which the transmission/reception direction of a signal is changed, information about the starting point and/or the end point of each period must be considered in order to determine the switching period.

The processing time information may include information about a convert processing period (Tc) used for performing up-conversion or down-conversion by the sampling rate conversion unit 320, a transmit processing period (Td) used for processing a transmission signal after the transmission signal is up-converted and before transmitting the same through the antenna, and a receive processing period (Tu) used for processing a reception signal after receiving the signal through the antenna and before down-converting the same (that is, before the signal is input to the sampling rate conversion unit 320). For example, the transmit processing period may indicate the time required for operations performed by a digital-to-analog (D/A) converter and an analog circuit for downlink after a transmission signal is up-converted and before transmitting the same through the antenna. In addition, the receive processing period may indicate the time required for an operation performed by an analog circuit for uplink and an analog-to-digital (A/D) converter after a reception signal is received through the antenna and before down-converting the same. Since the time at which the transmission/reception direction of a signal is changed may be different from the time at which the signal is actually input to the sampling rate conversion unit 320 due to the above processing times, the processing time information must be considered in order to determine the switching period.

Although not shown, according to various embodiments of the disclosure, in order to determine the switching period, a timing advance (TA) value, as well as the information about the frame configuration, the radio frame indicator, and the processing time information, may be further considered. The TA value is intended to control the time at which a signal transmitted from the terminal reaches the base station, and may be determined by the base station. Using the TA, the terminal may start transmitting a signal prior to the starting point of the uplink transmission period, and may terminate the transmission of a signal prior to the end point of the uplink transmission period. In other words, if a TA value is given, the terminal 120 may start transmitting a signal at the time the TA value earlier than the starting point of the uplink transmission period, and may terminate the transmission of a signal at the time the TA value earlier than the end point of the uplink transmission period. Hereinafter, an operation in which the terminal starts transmitting a signal at the time a TA value earlier than the starting point of the uplink transmission period and terminates the transmission of a signal at the time a TA value earlier than the end point of the uplink transmission period will be referred to as "TA transmission". Since the TA transmission of the terminal may affect the time at which a signal is input to the sampling rate conversion unit 320, the TA must also be considered in order to determine the switching period.

The sampling rate conversion unit 320 may up-convert a transmission signal, or may down-convert a reception signal according to a conversion mode. For example, in the case where the sampling rate conversion unit 320 operates in an up-conversion mode, the sampling rate conversion unit 320 may up-convert an input signal, thereby outputting an up-converted transmission signal. As another example, in the case where the sampling rate conversion unit 320 operates in a down-conversion mode, the sampling rate conversion unit 320 may down-convert an input signal, thereby outputting a down-converted reception signal. The conversion mode of the sampling rate conversion unit 320 may switch based on a switching signal from the switching signal generation unit 310. In other words, the conversion mode of the sampling rate conversion unit 320 may switch from an up-conversion mode to a down-conversion mode (in the case where the sampling rate conversion unit 320 is in an up-conversion mode), or may switch from a down-conversion mode to an up-conversion mode (in the case where the sampling rate conversion unit 320 is in a down-conversion mode) by the switching signal.

A detailed circuit configuration of the sampling rate conversion unit 320 will be described in more detail below with reference to FIG. 4.

Figure 4:
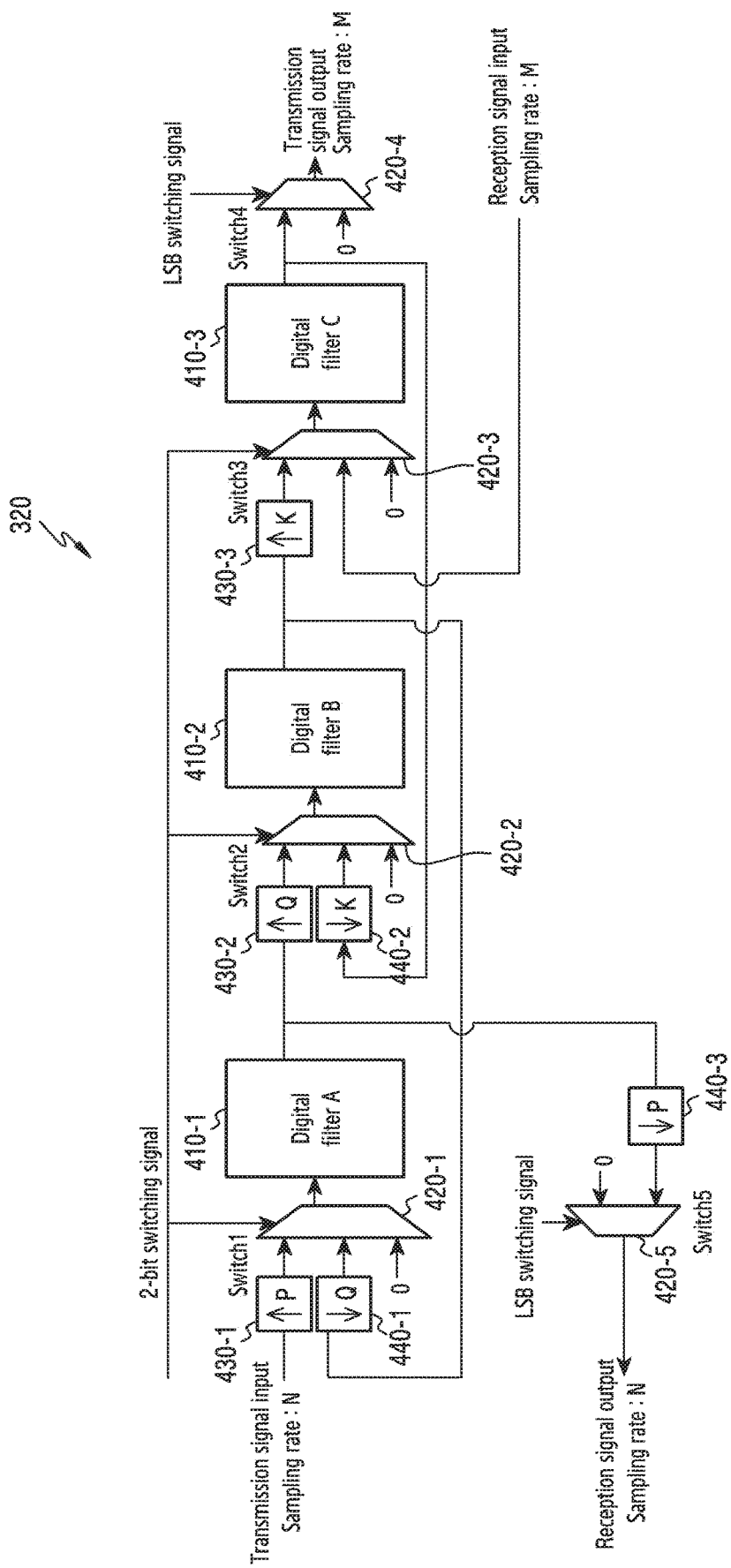
FIG. 4 illustrates the configuration of a sampling rate conversion unit in a wireless communication system according to various embodiments of the disclosure.

FIG. 4 illustrates the configuration of a sampling rate conversion unit in a wireless communication system according to various embodiments of the disclosure. Hereinafter, the term "-unit", "-or (er)", or the like denotes a unit for processing at least one function or operation, and may be implemented as hardware, software, or a combination thereof.

Referring to FIG. 4, the sampling rate conversion unit 320 may include a plurality of conversion circuits 430-1, 430-2, 430-3, 440-1, 440-2, and 440-3, a plurality of switches 420-1, 420-2, 420-3, 420-4, and 420-5, and a plurality of digital filters 410-1, 410-2, and 410-3. The numbers of conversion circuits, switches, and digital filters shown in FIG. 4 are only illustrative examples, the sampling rate conversion unit 320 may include various numbers of components according to a sampling rate conversion ratio (M/N, where M is the sampling rate of an output signal of the sampling rate conversion unit 320 and N is the sampling rate of an input signal of the sampling rate conversion unit 320).

The conversion circuits 430-1, 430-2 and 430-3 up-convert an input signal and provide the output thereof to the switches. For example, the conversion circuit 430-1 increases the sampling rate of an input signal by P times and provides the output thereof to switch 1 420-1. The conversion circuit 430-2 increases the sampling rate of an input signal by Q times and provides the output thereof to switch 2 420-2. The conversion circuit 430-3 increases the sampling rate of an input signal by K times and provides the output thereof to switch 3 420-3.

The conversion circuits 440-1, 440-2 and 440-3 down-convert an input signal and provide the output thereof to the switches. For example, the conversion circuit 440-1 reduces the sampling rate of an input signal by Q times and provides the output thereof to switch 1 420-1. The conversion circuit 440-2 reduces the sampling rate of an input signal by K times and provides the output thereof to switch 2 420-2. The conversion circuit 440-3 reduces the sampling rate of an input signal by P times and provides the output thereof to switch 5 420-5.

Each of the switches 420-1, 420-2, 420-3, 420-4, and 420-5 selects one of a plurality of input ports (the switches 420-1, 420-2, and 420-3 have three ports and the switches 420-4 and 420-5 have two ports) and outputs the signal received through the selected input port. The signals received through the input ports in the respective switches are shown in Table 1 below.

TABLE 1

|  | Input port 0 | Input port 1 | Input port 2 |
| --- | --- | --- | --- |
| Switch 420-1 | Output of conversion circuit 430-1 | Output of conversion circuit 440-1 | Null value |

TABLE 1-continued

|  | Input port 0 | Input port 1 | Input port 2 |
| --- | --- | --- | --- |
| Switch 420-2 | Output of conversion circuit 430-2 | Output of conversion circuit 440-2 | Null value |
| Switch 420-3 | Output of conversion circuit 430-3 | Reception signal input | Null value |
| Switch 420-4 | Output of digital filter 410-3 | Null value | — |
| Switch 420-5 | Null value | Output of conversion circuit 440-3 | — |

The switches 420-1, 420-2, and 420-3 may select an input port for outputting a signal, based on a 2-bit switching signal received from the switching signal generation unit 310. For example, the relationship between the selection of the input port in the switches 420-1, 420-2, and 420-3 and the switching signals is shown in Table 2 below.

TABLE 2

| 2-bit switching signal | Selected output |
| --- | --- |
| "00" | Input port 0 |
| "01" | Input port 1 |
| "10" | "0" (=input port 2) |
| "11" | "0" (=input port 2) |

The outputs from the switches 420-1, 420-2, and 420-3 corresponding to the selected input ports are provided as inputs to the digital filters 410-1, 410-2, and 410-3, respectively.

The switches 420-4 and 420-5 may select an input port for outputting a signal, based on a least significant bit (LSB) in a 2-bit switching signal. For example, the relationship between the selection of the input ports in the switches 420-4 and 420-5 and the switching signals is shown in Table 3 below.

TABLE 3

| LSB in 2-bit switching signal | Selected output |
| --- | --- |
| "0" | Input port 0 |
| "1" | Input port 1 |

The digital filters 410-1, 410-2, and 410-3 receive, as inputs, the outputs of the switches 420-1, 420-2, and 420-3, respectively, and perform filter operations on the received inputs, thereby outputting the results of the filter operations. The filter operation may include an operation for removing signal images of a frequency domain from the signal inputs to the respective digital filters 410-1, 410-2, and 410-3. The respective digital filters 410-1, 410-2, and 410-3 may include a memory to perform the filter operations.

In the case where input ports 0 of the switches 420-1, 420-2, 420-3, 420-4, and 420-5 are selected by the switching signal, the sampling rate conversion unit 320 operates in an up-conversion mode, and the signal flow thereof is as follows.

Signal flow in up-conversion mode: Transmission signal input (sampling rate: N)→conversion circuit 430-1→switch 1 420-1→digital filter 410-1→conversion circuit 430-2→switch 2 420-2→digital filter 410-2→conversion circuit 430-3→switch 3 420-3→digital filter 410-3→switch 4 420-4→transmission signal output (sampling rate: M)

Alternatively, in the case where input ports 1 of the switches 420-1, 420-2, 420-3, 420-4, and 420-5 are selected by the switching signal, the sampling rate conversion unit 320 operates in a down-conversion mode, and the signal flow thereof is as follows.

Signal flow in down-conversion mode: Reception signal input (sampling rate: M)→switch 3 420-3→digital filter 410-3→conversion circuit 420-2→switch 2 420-2→digital filter 410-2→conversion circuit 440-1→switch 1 420-1→conversion circuit 440-3→switch 5 420-5→reception signal output (sampling rate: N).

According to the signal flows in the respective conversion modes, the same digital filters 410-1, 410-2, and 410-3 are used in different conversion modes. Therefore, if the conversion mode is changed, data for performing an operation related to the conversion mode before the change may remain in the memories of the digital filters 410-1, 410-2, and 410-3. Since the data remaining in the memories of the digital filters 410-1, 410-2, and 410-3 may affect the operations performed in the digital filters 410-1, 410-2, and 410-3 after the conversion mode is changed, the digital filters 410-1, 410-2, and 410-3 must be reset before the operations are performed by the digital filters 410-1, 410-2, and 410-3. According to various embodiments of the disclosure, in the case where the memories of the digital filters 410-1, 410-2, and 410-3 are implemented based on synchronous dynamic random access memory (SDRAM), input ports 2 of the switches 420-1, 420-2, and 420-3 may be selected by a switching signal (e.g., "10" or "1") in order to reset the digital filters 410-1, 410-2, and 410-3. In the case where input ports 2 are selected, the switches 420-1, 420-2, and 420-3 may output null values received through input ports 2, and the digital filters 410-1, 410-2, and 410-3 may receive null values from the switches 420-1, 420-2 and 420-3, respectively, thereby resetting the memories of the switches 420-1, 420-2, and 420-3. According to various embodiments of the disclosure, in the case where the memories of the digital filters 410-1, 410-2, and 410-3 are implemented based on a resettable flip-flop, a signal corresponding to the most significant bit (e.g., "1") of a switching signal (e.g., "10" or "11") may serve as a reset input of the memory devices, thereby resetting the memories.

Although the digital filters 410-1, 410-2, and 410-3 are illustrated as separate components from the conversion circuits 430-1, 430-2, 430-3, 440-1, 440-2, and 440-3 in FIG. 4, this is an illustrative example, and the digital filters 410-1, 410-2, and 410-3 and the conversion circuits 430-1, 430-2, 430-3, 440-1, 440-2, and 440-3 may be implemented as a single component through the integration of operations.

Hereinafter, factors to be considered in order to determine the switching period and a method of determining the switching period will be described with reference to FIGS. 5 to 6.

Figure 5A:
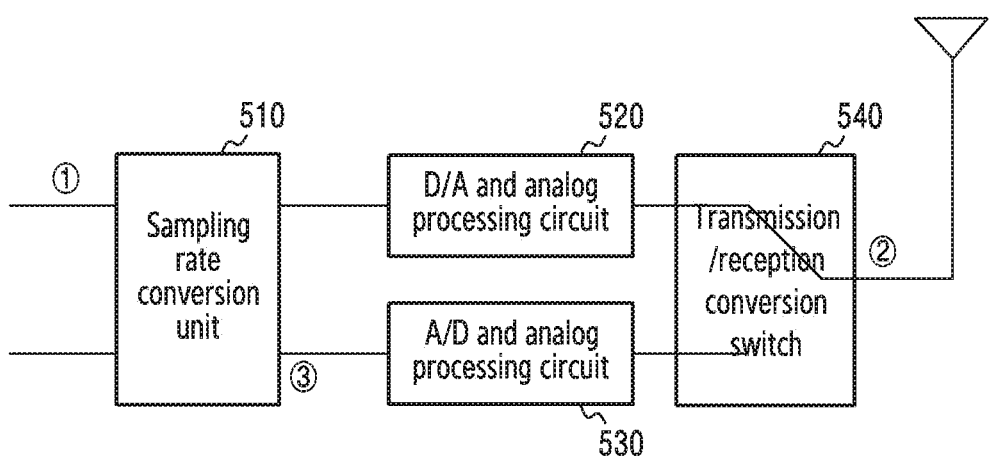
FIG. 5A illustrates configurations related to the operation of a sampling rate conversion unit when a transmission/reception path is switched in a wireless communication system according to various embodiments of the disclosure.

FIG. 5A illustrates configurations related to the operation of a sampling rate conversion unit when a transmission/reception path is switched in a wireless communication system according to various embodiments of the disclosure. Hereinafter, the term "-unit", "-or (er)", or the like denotes a unit for processing at least one function or operation, and may be implemented as hardware, software, or a combination thereof.

Referring to FIG. 5A, the communication unit 210 and/or the controller 220 may include a sampling rate conversion unit 510, a D/A and analog processing circuit 520, an A/D and analog processing circuit 530, and a transmission/reception conversion switch 540.

The sampling rate conversion unit 510 is a sampling conversion circuit, and is the same as the sampling rate conversion unit 320. It is illustrated in FIG. 5A that a transmission signal is input to position ① of the sampling rate conversion unit 510 and that a reception signal is input to position ③ of the sampling rate conversion unit 510.

The D/A and analog processing circuit 520 may convert a digital signal up-converted by the sampling rate conversion unit 510 into an analog signal. In addition, the D/A and analog processing circuit 520 may perform a process of transmitting the converted analog signal through the antenna. For example, the D/A and analog processing circuit 520 may include at least one of an analog filter, a mixer, a power amplifier, and a phase locked loop (PLL) to process analog signals.

The transmission/reception conversion switch 540 may control the transmission/reception direction of a signal. For example, in the downlink transmission period, the transmission/reception conversion switch 540 may be connected to the D/A and the analog processing circuit 520 to perform control such that the base station 110 transmits a signal. As another example, in the uplink transmission period, the transmission/reception conversion switch 540 may be connected to the A/D and analog processing circuit 530 to perform control such that the base station 110 receives a signal. In FIG. 5A, position (indicates the state immediately before a transmission signal passing through the transmission/reception conversion switch 540 is transmitted through the antenna and the state immediately before a reception signal received through the antenna passes through the transmission/reception conversion switch 540.

The A/D and analog processing circuit 530 may process an analog signal received through the antenna, thereby converting the same into a digital signal. For example, the A/D and analog processing circuit 530 may include at least one of an analog filter, a mixer, a power amplifier, and a phase locked loop (PLL) to process analog signals.

Figure 5B:
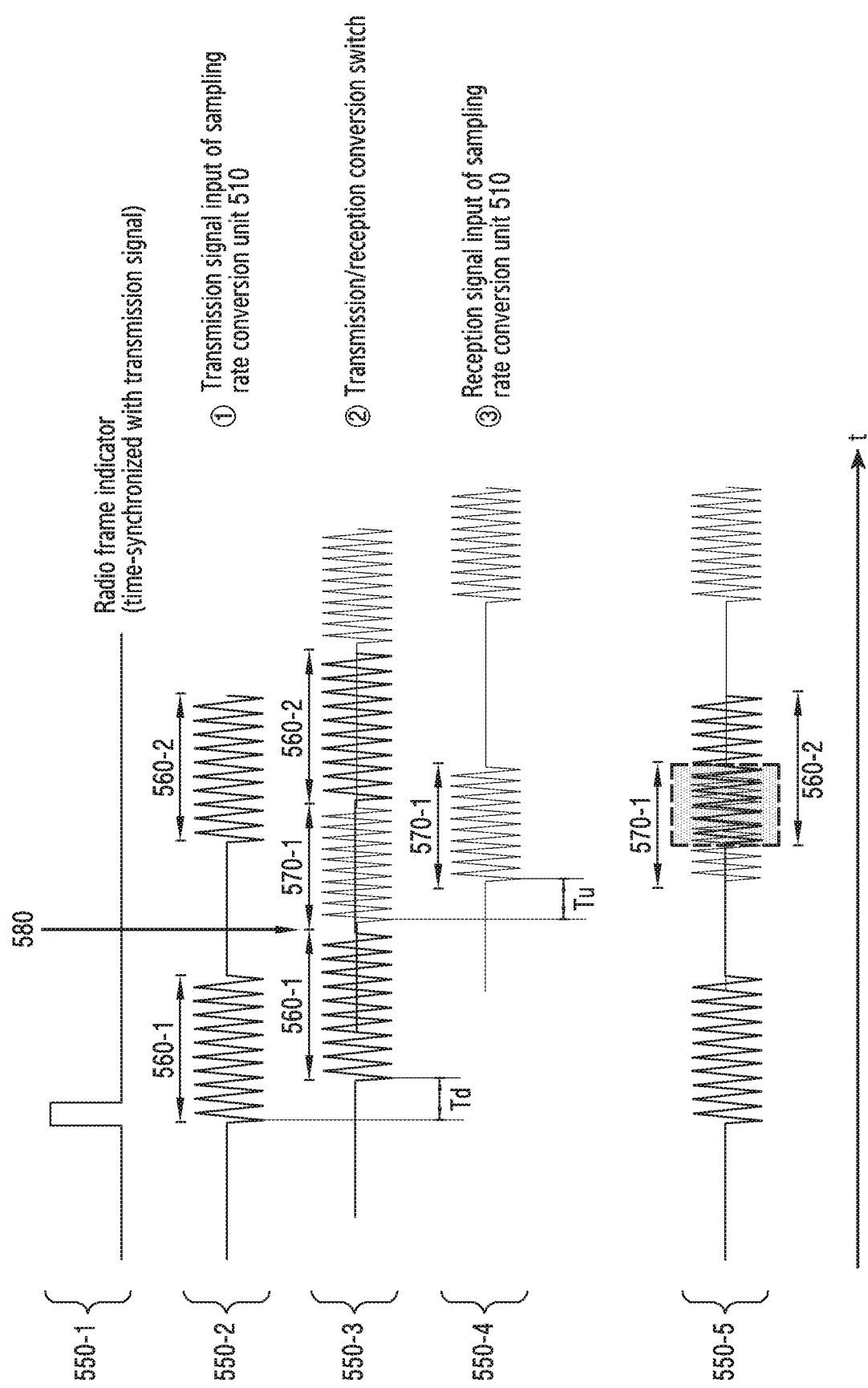
FIG. 5B illustrates signal flow related to a sampling rate conversion unit in a wireless communication system according to various embodiments of the disclosure.

FIG. 5B illustrates a signal flow related to a sampling rate conversion unit in a wireless communication system according to various embodiments of the disclosure. It is assumed that a TA is not used in FIG. 5B. In other words, it is assumed in FIG. 5B that the terminal starts transmitting a signal at the starting point of the uplink transmission period and terminates the transmission of a signal at the end point of the uplink transmission period.

Waveform 550-1 illustrates the generation of a radio frame indicator. The radio frame indicator may indicate the starting point of the frame. According to various embodiments of the disclosure, it is assumed that the starting point of the frame is synchronized with the starting point of the downlink transmission period. In this case, the time at which the radio frame indicator is generated may be the same as the starting point of the frame and the starting point of the downlink transmission period.

Waveform 550-2 shows the waveform of the signal measured at position ① (in FIG. 5A. More specifically, the waveform 550-2 includes a waveform of a transmission signal 560-1 transmitted in a first downlink transmission period and a waveform of a transmission signal 560-2 transmitted in a second downlink transmission period.

Waveform 550-3 shows the waveform of the signal measured at position ② in FIG. 5A. More specifically, the waveform 550-3 includes a waveform of a transmission signal 560-1, a waveform of a transmission signal 560-2, and a waveform of a reception signal 570-1 in an uplink transmission period between the first downlink transmission period and the second downlink transmission period. The transmission signal 560-1 and the transmission signal 560-2 at position ② are delayed by a transmit processing period (Td), compared to those at position ①. Although not shown, in the case where a convert processing period (Tc) is further considered, the transmission signal 560-1 and the transmission signal 560-2 at position ① are delayed by the sum of the transmit processing period (Td) and the convert processing period (Tc), compared to those at position ①. In addition, the transmission/reception conversion switch 540 is switched at a time 580, and the reception signal 570-1 is received through the antenna from the time 580. The transmission/reception conversion switch 540 may determine the time 580, based on the transmit processing period (Td), the convert processing period (Tc), and information on a frame configuration.

Waveform 550-4 illustrates the waveform of the signal measured at position ③ in FIG. 5A. More specifically, the waveform 550-4 includes a waveform of a reception signal 570-1. As shown in the drawing, the reception signal 570-1 at position ③ is delayed by a receive processing period (Tu), compared to that at position ②.

Waveform 550-5 indicates the waveform of the signal measured at an input terminal of the sampling rate conversion unit 510. For example, the waveform 550-5 may be a waveform representing the sum of the signal measured at position ① and the signal measured at position ③. As shown in the drawing, due to the delay caused by the transmit processing period (Td), the receive processing period (Tu), and the convert processing period (Tc), the reception signal 570-1 in the uplink transmission period may overlap the transmission signal 560-2 in the second downlink transmission period, which starts immediately after the end of the uplink transmission period. Since the reception signal 570-1 at position ③ is delayed by the sum (Td+Tu+Tc) of the transmit processing period (Td), the receive processing period (Tu), and the convert processing period (Tc), compared to that at position ①, an overlapping period in which the reception signal 570-1 and the transmission signal 560-2 overlap each other may be defined as a length (this means a temporal length) corresponding to Td+Tu+Tc. Hereinafter, the delay (=Td+Tu+Tc) generated with respect to a reception signal at an input terminal of the sampling rate conversion unit 510 will be referred to as a "reception signal delay".

If the transmission/reception direction of a signal is changed from a transmission direction to a reception direction (that is, if the conversion mode of the sampling rate conversion unit 510 switches from an up-conversion mode to a down-conversion mode), since the GP is provided between the downlink transmission period and the subsequent uplink transmission period, a transmission signal and a reception signal may not overlap at the input terminal of the sampling rate conversion unit 510 despite the reception signal delay. However, as described above, if the transmission/reception direction of a signal is changed from a reception direction to a transmission direction (that is, if the conversion mode of the sampling rate conversion unit 510 switches from a down-conversion mode to an up-conversion mode), since there is no separate GP and the downlink transmission period starts immediately after the uplink transmission period ends, a transmission signal and a reception signal may overlap at the input terminal of the sampling rate conversion unit 510 due to the reception signal delay. In the case where the overlapping occurs, some of the data on at least one of the transmission signal and the reception signal may not be processed, regardless of the time at which the conversion mode of the sampling rate conversion unit 510 switches (i.e., regardless of whether the conversion mode switches in the overlapping period or in the non-overlapping period).

This problem may be solved when the terminal performs TA transmission. In the case where the terminal performs TA transmission, since there is an interval corresponding to a TA value after the terminal completes the transmission of a signal and before the start of the downlink transmission period, the transmission signal and the reception signal may not overlap at the input terminal of the sampling rate conversion unit 510 despite the reception signal delay. Accordingly, the switching signal generation unit 310 may determine an appropriate switching period for controlling the conversion mode of the sampling rate conversion unit 510 using the TA value.

In order to prevent signals from overlapping at the input terminal when the sampling rate conversion unit 510 switches the conversion mode from a down-conversion mode to an up-conversion mode, Equation 1 below must be satisfied.

$$TA > Tc + Td + Tu + Tc + T_{refresh} \quad \text{Equation 1}$$

Here, TA is a timing advance value, Tc is a convert processing period, Td is a transmit processing period, and Tu is a receive processing period. $T_{refresh}$ denotes the time required to reset the memory of at least one digital filter included in the sampling rate conversion unit 510. Equation 1 means that the sum of a delay of a reception signal {reception signal delay (Tc+Td+Tu)} at the input terminal of the sampling rate conversion unit 510, the time required for down-converting a reception signal {convert processing period (Tc)}, and the time ($T_{refresh}$) required for resetting the memory of at least one digital filter included in the sampling rate conversion unit 510 after down-converting the reception signal is less than a TA value (=an interval after the terminal completes transmission of a signal and before the downlink transmission period starts).

Hereinafter, a detailed method of determining a switching period will be described with reference to FIGS. 6A and 6B.

Figure 6A:
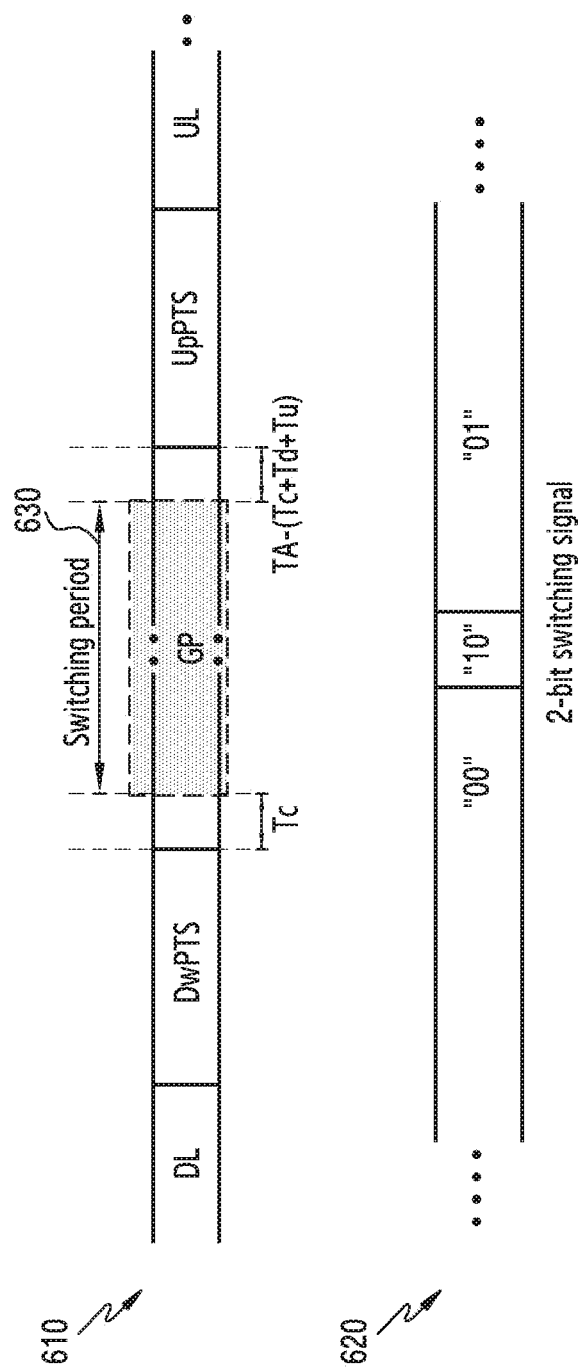
FIG. 6A illustrates a switching period and the configuration of a switching signal for switching a conversion mode from an up-conversion mode to a down-conversion mode in a wireless communication system according to various embodiments of the disclosure.

FIG. 6A illustrates a switching period and the configuration of a switching signal for switching a conversion mode from an up-conversion mode to a down-conversion mode in a wireless communication system according to various embodiments of the disclosure. FIG. 6A illustrates a frame area 610 in relation to the case in which the transmission/reception direction of a signal is changed from a transmission direction to a reception direction, a configuration 620 of a switching signal, and a switching period 630 in which the conversion mode of the sampling rate conversion unit 510 switches from an up-conversion mode to a down-conversion mode.

The starting point and the end point of the switching period 630 may be determined using Equation 2 below.

(Starting point of switching period 630)=(End point of downlink transmission period)+Tc, (End point of switching period 630)=(End point of GP)−TA+Tc+Td+Tu  Equation 2

In Equation 2, the end point of the GP is the same as the starting point of the uplink transmission period. Equation 2 means that the switching period 630 may be configured from the time {convert processing period (Tc)} required for up-converting a transmission signal after the base station 110 completes the transmission of a signal (the end point of the downlink transmission period) to the time during which a reception signal from the terminal is delayed at the input terminal of the sampling rate conversion unit 510 {reception signal delay (Tc+Td+Tu)} after the terminal starts transmitting a signal (end point of GP-TA). The switching signal generation unit 310 may generate a switching signal, and may provide the generated switching signal to the sampling rate conversion unit 510 within the switching period 630, so that the sampling rate conversion unit 510 may switch the conversion mode from an up-conversion mode to a down-conversion mode within the switching period 630.

According to the configuration 620 of the switching signal, the switching signal may include a bit sequence "01" for switching the conversion mode of the sampling rate conversion unit 510 from an up-conversion mode to a down-conversion mode. In addition, the switching signal may include a control signal (bit sequence "10") for resetting the memory of at least one digital filter included in the sampling rate conversion unit 510. In the configuration 620 of the switching signal, the time corresponding to the control signal (bit sequence "10") may be $T_{refresh}$. Although not shown in Equation 2, the switching signal generation unit 310 must reset the memory of at least one digital filter included in the sampling rate conversion unit 510 (this corresponds to $T_{refresh}$), and must then generate a switching signal for changing the conversion mode of the sampling rate conversion unit 510 within the switching period 630.

Figure 6B:
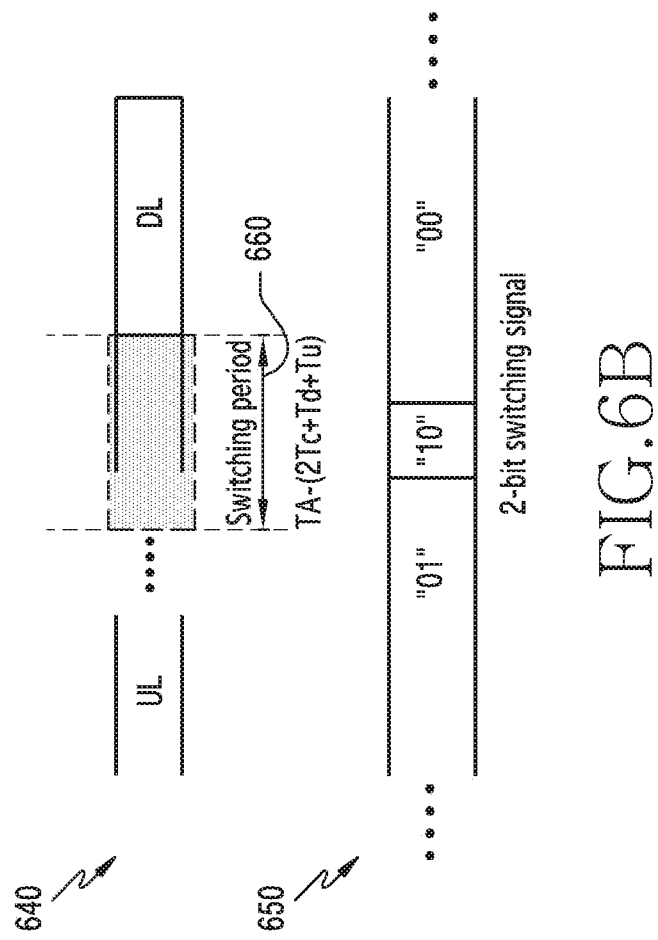
FIG. 6B illustrates a switching period and the configuration of a switching signal for switching a conversion mode from a down-conversion mode to an up-conversion mode in a wireless communication system according to various embodiments of the disclosure.

FIG. 6B illustrates a switching period and the configuration of a switching signal for switching a conversion mode from a down-conversion mode to an up-conversion mode in a wireless communication system according to various embodiments of the disclosure. FIG. 6B illustrates a frame area 640 in relation to the case in which the transmission/reception direction of a signal is changed from a reception direction to a transmission direction, the configuration 650 of a switching signal, and a switching period 660 in which the conversion mode of a sampling rate conversion unit 510 switches from a down-conversion mode to an up-conversion mode.

The starting point and the end point of the switching period 660 may be determined by Equation 3 below.

(Starting point of switching period 660)=(End point of uplink transmission period)-TA+2×Tc+Td+Tu (End point of switching period 660)=(Starting point of downlink transmission period)   Equation 3

In Equation 3, the end point of the uplink transmission period is the same as the starting point of the downlink transmission period. Equation 3 means that the switching period 660 may be configured from the time corresponding to the sum of the time during which a reception signal from the terminal is delayed at the input terminal of the sampling rate conversion unit 510 {reception signal delay (Tc+Td+Tu)} after the terminal 120 completes transmission of a signal (end point of uplink transmission period—TA) and the time required for down-converting a reception signal {convert processing period (Tc)} to the time at which the base station 110 starts transmitting a signal (the starting point of the downlink transmission period). According to Equation 3, the length of the switching period 660 may be determined as TA-(2Tc+Td+Tu). The switching signal generation unit 310 may generate a switching signal, and may provide the generated switching signal to the sampling rate conversion unit 510 within the switching period 660, so that the sampling rate conversion unit 510 may switch the conversion mode from a down-conversion mode to an up-conversion mode within the switching period 660.

The configuration 650 of the switching signal may include a bit sequence "00" for switching the conversion mode of the sampling rate conversion unit 510 from a down-conversion mode to an up-conversion mode by the switching signal. In addition, the switching signal may include a control signal (bit sequence "10") for resetting a memory of at least one digital filter included in the sampling rate conversion unit 510. In the configuration 650 of the switching signal, the time corresponding to the control signal (bit sequence "10") may be $T_{refresh}$. Although not shown in Equation 3, the switching signal generation unit 310 must reset the memory of at least one digital filter included in the sampling rate conversion unit 510 (it takes time corresponding to $T_{refresh}$), and must then generate a switching signal for changing the conversion mode of the sampling rate conversion unit 510 within the switching period 660.

Hereinafter, the structure of the switching signal generation unit 310 and an algorithm for determining the time at which the switching signal generation unit 310 generates a switching signal in the switching period will be described with reference to FIG. 7.

Figure 7:
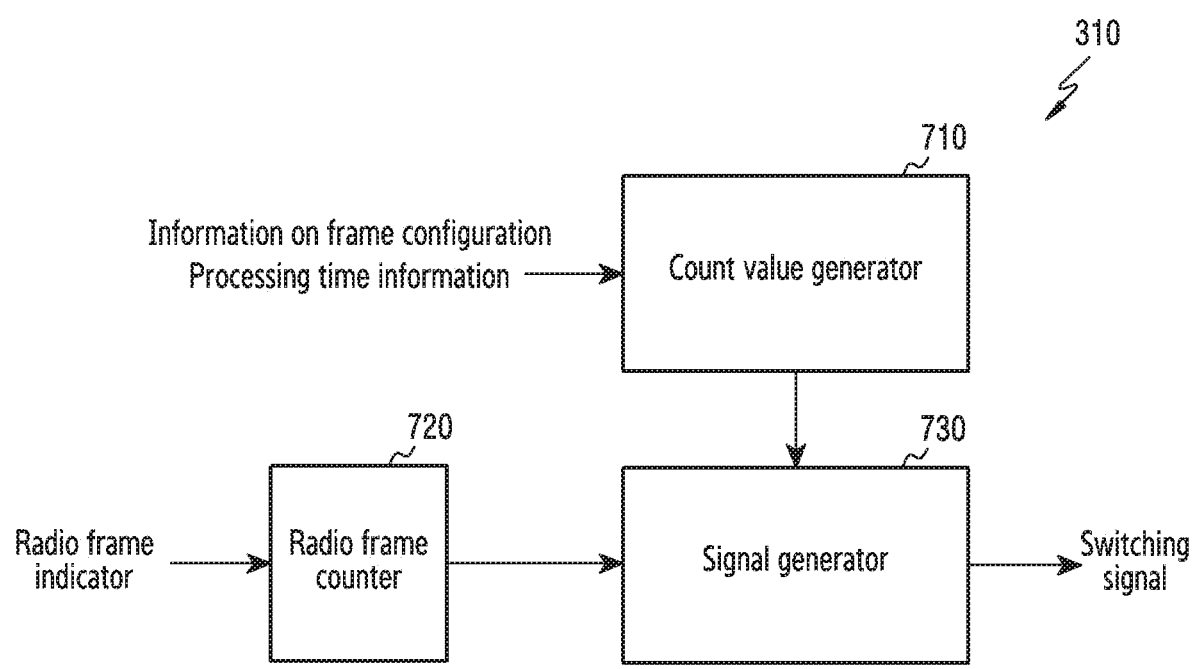
FIG. 7 illustrates the configuration of a switching signal generation unit in a wireless communication system according to various embodiments of the disclosure.

FIG. 7 illustrates the configuration of a switching signal generation unit 310 in a wireless communication system according to various embodiments of the disclosure. Hereinafter, the term "-unit", "-or (er)", or the like denotes a unit for processing at least one function or operation, and may be implemented as hardware, software, or a combination thereof.

Referring to FIG. 7, the switching signal generation unit 310 includes a count value generator 710, a radio frame counter 720, and a signal generator 730.

The count value generator 710 may determine at least one count value corresponding to the switching period. In this case, the switching period may include a period for switching the conversion mode of the sampling rate conversion unit 320 from an up-conversion mode to a down-conversion mode and a period for switching the same from a down-conversion mode to an up-conversion mode. The count value generator 710 may determine the position of the switching period in the frame, based on information about a frame configuration and processing time information. Although not shown, the count value generator 710 may further consider a TA value to determine the position of the switching period in the frame. More specifically, the count value generator 710 may determine the position of the switching period in the frame using Equation 2 and Equation 3. The count value generator 710 may determine at least one count value corresponding to the switching period, based on the position of the switching period and a clock frequency. In addition, the count value generator 710 may determine a count value corresponding to the time (or period) for resetting the memory of at least one filter included in the sampling rate conversion unit 320 within the switching period. The count value generator 710 may provide at least one generated count value to the signal generator 730.

The radio frame counter 720 generates count values that increase every clock in accordance with a clock frequency. The radio frame counter 720 may set the count value to zero at the starting point of the frame indicated by the radio frame indicator, and may generate count values that increase every clock from zero. Accordingly, the count value at a specific time may indicate the time taken from the starting point of the frame to the specific time. The radio frame indicator may reset the count value. In other words, in the case where the starting point of a subsequent frame is indicated by the radio frame indicator, the radio frame counter 720 may increase the count value from zero. The radio frame counter 720 may provide the generated count values to the signal generator 730.

The signal generator 730 may generate a switching signal, based on at least one count value provided from the count value generator 710 and counter values provided from the radio frame counter 720. More specifically, if a counter value provided from the radio frame counter 720 matches at least one count value provided from the count value generator 710, the signal generator 730 may determine that the current time is a time within the switching period, and may generate a switching signal within the switching period. For example, if a counter value provided from the radio frame counter 720 matches at least one count value corresponding to a switching period for switching the conversion mode of the sampling rate conversion unit 320 from an up mode to a down mode, the signal generator 730 may generate a switching signal including a bit sequence "01". As another example, if a counter value provided from the radio frame counter 720 matches at least one count value corresponding to a switching period for switching the conversion mode of the sampling rate conversion unit 320 from a down mode to an up mode, the signal generator 730 may generate a switching signal including a bit sequence "00". As another example, if a counter value provided from the radio frame counter 720 matches at least one count value corresponding to the time (or period) for resetting the memory of at least one digital filter included in the sampling rate conversion unit 320, the signal generator 730 may generate a switching signal including a bit sequence "10" or "11". The signal generator 730 may provide the generated switching signals to the sampling rate conversion unit 320, thereby switching the conversion mode of the sampling rate conversion unit 320.

Figure 8:
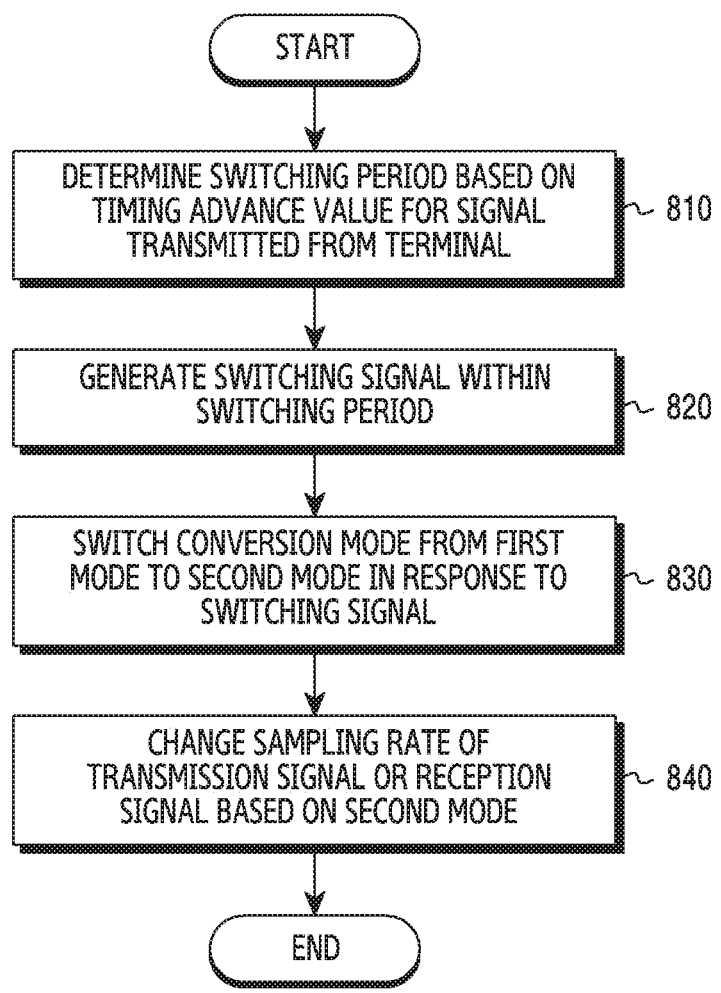
FIG. 8 is a flowchart illustrating the operation of a base station in a wireless communication system according to various embodiments of the disclosure.

FIG. 8 is a flowchart illustrating the operation of a base station in a wireless communication system according to various embodiments of the disclosure.

Referring to FIG. 8, in step 810, the base station 110 determines a switching period, based on a TA value with respect to a signal transmitted from the terminal 120. The base station 110 may determine a switching period for controlling a conversion mode of the sampling rate conversion circuit, based on the TA value for the signal transmitted from the terminal 120. Although not shown, the base station 110 may use information on a frame configuration, processing time information, and a radio frame indicator, as well as the TA value, to determine the switching period. For example, the base station 110 may determine the switching period according to Equation 2 or Equation 3.

In step 820, the base station 110 generates a switching signal within the switching period. The base station 110 may determine that the current time is a time within the switching period, based on count values, and may generate a switching signal within the switching period. A detailed algorithm for generating a switching signal within the switching period will be described in more detail below with reference to FIG. 10.

In step 830, the base station 110 switches the conversion mode from a first mode to a second mode in response to the switching signal. The base station 110 may switch the conversion mode of the sampling rate conversion circuit from a first mode to a second mode in response to the switching signal. Here, one of the first mode and the second mode may be an up-conversion mode for increasing the sampling rate of a transmission signal, and the remaining one may be a down-conversion mode for reducing the sampling rate of a reception signal.

In step 840, the base station 110 changes the sampling rate of a transmission signal or a reception signal, based on the second mode. For example, in the case where the second mode is an up-conversion mode, the base station 110 may up-convert a transmission signal. In the case where the second mode is a down-conversion mode, the base station 110 may down-convert a reception signal.

Figure 9:
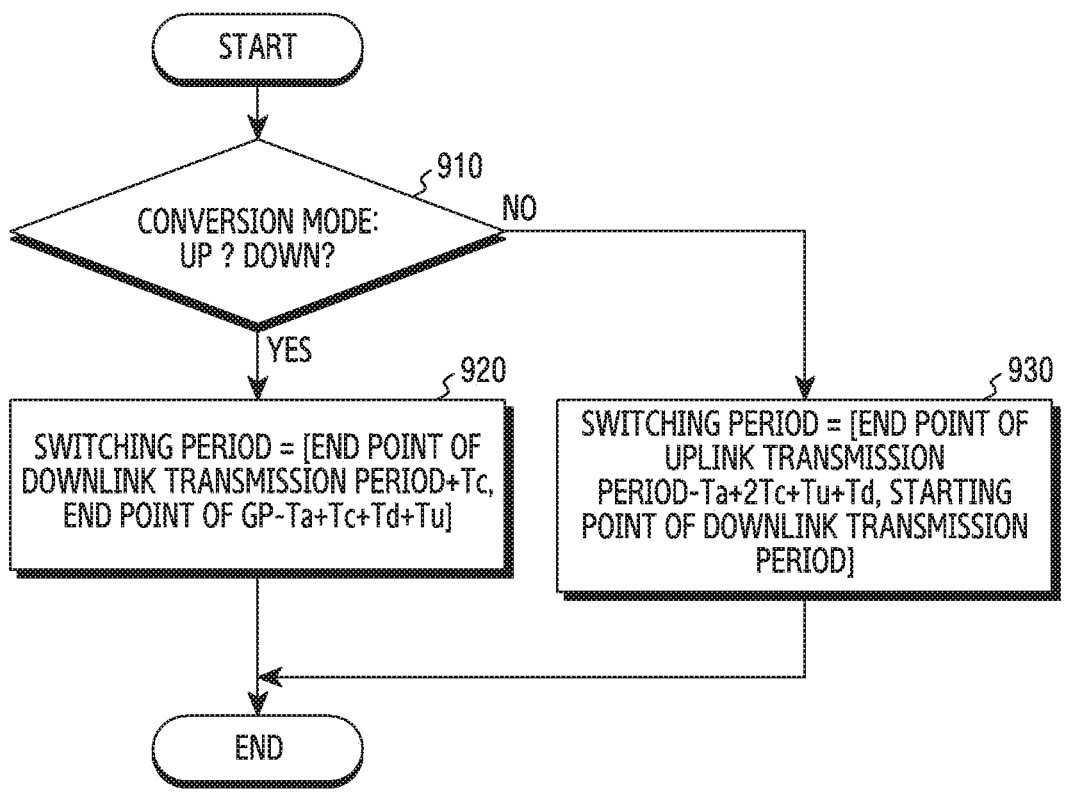
FIG. 9 is a flowchart illustrating an operation of determining a switching period in a wireless communication system according to various embodiments of the disclosure.

FIG. 9 is a flowchart illustrating an operation of determining a switching period in a wireless communication system according to various embodiments of the disclosure.

Referring to FIG. 9, in step 910, the base station 110 determines whether or not to change the conversion mode of the sampling rate conversion circuit from an up-conversion mode to a down-conversion mode. For example, in the case where the base station 110 is currently up-converting a transmission signal in the downlink transmission period, the base station 110 may determine to switch the conversion mode of the sampling rate conversion circuit from an up-conversion mode to a down-conversion mode in order to down-convert a reception signal in the next uplink transmission period. As another example, in the case where the base station 110 is currently down-converting a reception signal in the uplink transmission period, the base station 110 may determine to switch the conversion mode of the sampling rate conversion circuit from an up-conversion mode to a down-conversion mode in order to up-convert a transmission signal in the next downlink transmission period.

If it is determined that the conversion mode of the sampling rate conversion circuit is to be switched from the up-conversion mode to the down-conversion mode, the base station 110 may determine the switching period as shown in Equation 2 in step 920. In other words, the base station 110 may configure the switching period for switching the conversion mode of the sampling rate conversion circuit from the up-conversion mode to the down-conversion mode as an interval from the time {convert processing period (Tc)} required for up-converting a transmission signal after the base station 110 completes the transmission of a signal (the end point of the downlink transmission period) until the time during which a reception signal from the terminal is delayed at the input terminal of the sampling rate conversion unit 510 (reception signal delay (Tc+Td+Tu)) after the terminal 120 starts transmitting a signal (end point of GP−TA).

If it is determined that the conversion mode of the sampling rate conversion circuit is not to be switched from the up-conversion mode to the down-conversion mode, that is, if it is determined that the conversion mode of the sampling rate conversion circuit is to be switched from the down-conversion mode to the up-conversion mode, the base station 110 may determine the switching period as shown in Equation 3 in step 930. In other words, as shown in Equation 3, the base station 110 may configure the switching period for switching the conversion mode of the sampling rate conversion circuit from the down-conversion mode to the up-conversion mode as an interval from the time corresponding to the sum of the time during which a reception signal from the terminal is delayed at the input terminal of the sampling rate conversion unit 510 (reception signal delay (Tc+Td+Tu)) after the terminal 120 completes transmission of a signal (end point of uplink transmission period—TA) and the time required for down-converting a reception signal (convert processing period (Tc)) to the time at which the base station 110 starts transmitting a signal (the starting point of the downlink transmission period).

Figure 10:
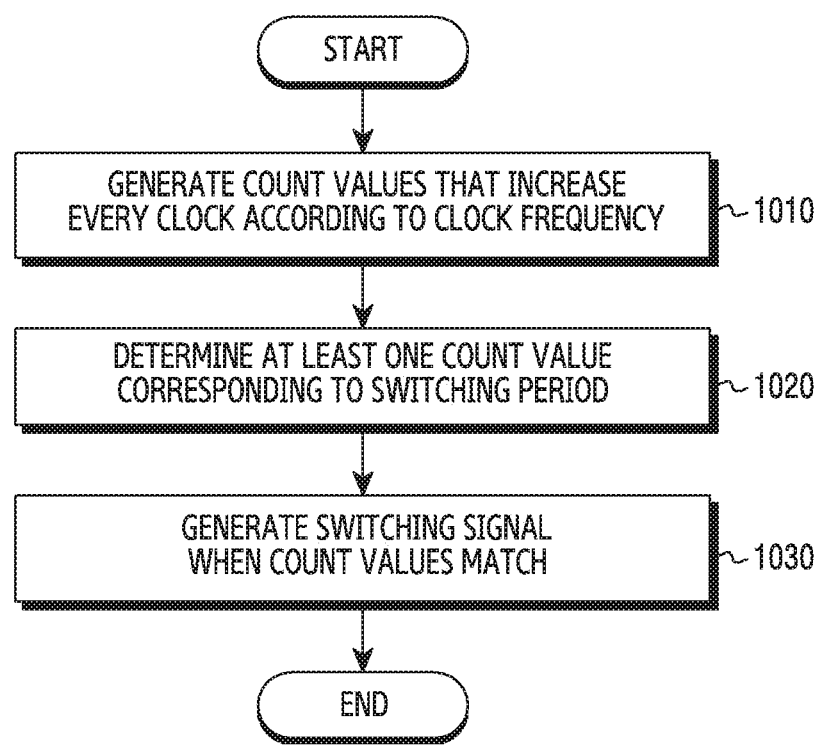
FIG. 10 illustrates a flowchart illustrating an operation of generating a switching signal in a wireless communication system according to various embodiments of the disclosure.

FIG. 10 illustrates a flowchart illustrating an operation of generating a switching signal in a wireless communication system according to various embodiments of the disclosure.

Referring to FIG. 10, in step 1010, the base station 110 generates count values that increase every clock according to a clock frequency. The base station 110 may set the count value to zero at the starting point of the frame indicated by the radio frame indicator, and may generate count values that increase every clock from zero. Accordingly, the count value at a specific time may indicate the time taken from the starting point of the frame to the specific time. The radio frame indicator may reset the count value. In other words, in the case where the starting point of the next frame is indicated by the radio frame indicator, the base station 110 may increase the count value from zero.

In step 1020, the base station 110 may determine at least one count value corresponding to a switching period. The base station 110 may determine the position of the switching period in the frame, based on information on a frame configuration, processing time information, and a TA value. In addition, the base station 110 may determine at least one count value corresponding to the switching period in the frame, based on the position of the switching period and a clock frequency. The base station 110 may determine a count value corresponding to the time (or period) for resetting the memory of at least one filter included in the sampling rate conversion unit within the switching period.

In step 1030, the base station 110 generates a switching signal when the count values match each other. If at least one of the count values that increase every clock matches at least one count value corresponding to the switching period, the base station 110 may determine that the current time is a time within the switching period, and may generate a switching signal within the switching period. For example, if the count values match each other while the current conversion mode of the sampling rate conversion circuit is an up-conversion mode, the base station 110 may generate a switching signal (e.g. a bit sequence "01") for switching the conversion mode of the sampling rate conversion circuit from an up-conversion mode to a down-conversion mode within the switching period. As another example, if the count values match each other while the current conversion mode of the sampling rate conversion circuit is a down-conversion mode, the base station 110 generate a switching signal (e.g. a bit sequence "00") for switching the conversion mode of the sampling rate conversion circuit from a down-conversion mode to an up-conversion mode within the switching period. As another example, if a count value corresponding to the time (or period) for resetting a memory of at least one filter included in the sampling rate conversion unit matches a counter value that increases every clock within the switching period, the base station 110 may generate a control signal (e.g., a sequence "10" or "11") for reset.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system employing a time division duplex (TDD) scheme, the method comprising:
 in case that a timing advance (TA) value with respect to an uplink signal to be transmitted from a terminal is larger than a sum of a processing time of the uplink signal and a processing time of a downlink signal, identifying a switching period for controlling a conversion mode of a sampling rate conversion circuit;
 generating a switching signal within the switching period;
 switching the conversion mode from a first mode to a second mode in response to the switching signal; and
 based on the second mode, changing a sampling rate of the uplink signal or the downlink signal.

2. The method of claim 1,
 wherein the processing time of the uplink signal is a sum of a processing time of a conversion and a processing time of a reception signal, and
 wherein the processing time of the downlink signal is a sum of the processing time of the conversion and a processing time of a transmission signal.

3. The method of claim 2,
 wherein the generating the switching signal comprises:
  generating count values that increase every clock according to a clock frequency,
  determining at least one count value corresponding to the switching period, based on at least one of the clock frequency, the TA, the processing time, or information on configuration of a frame, and
  generating the switching signal when at least one of the count values matches the at least one count value, and wherein the count values are reset by a radio frame indicator, and wherein the radio frame indicator indicates a start time of the frame.

4. The method of claim 2, wherein the identifying of the switching period is based on information on a configuration of a frame through which the uplink signal and the downlink signal are transmitted and received, and wherein the information on the configuration of the frame comprises information on lengths and arrangements of respective ones of an uplink transmission period, a downlink transmission period, or a guard period (GP).

5. The method of claim 1, wherein the sampling rate conversion circuit comprises:
a filter,
a first conversion circuit operating in the first mode, and
a second conversion circuit operating in the second mode, wherein the filter receives an output of the first conversion circuit, which is received through a first connection between the first conversion circuit and the filter, or receives an output of the second conversion circuit through a second connection between the second conversion circuit and the filter, performs a filter operation on the received output, and outputs a result of the filter operation, wherein the output of the sampling rate conversion circuit is determined based on the result of the filter operation, and wherein the first connection is released and the second connection is established based on the switching signal.

6. The method of claim 5, wherein the switching signal comprises a control signal for resetting a memory of the filter, and wherein the control signal is a signal for deleting data related to the first mode from the memory in order to perform an operation corresponding to the second mode in the filter.

7. The method of claim 1, wherein the first mode is a down-conversion mode for reducing a sampling rate of the uplink signal, and wherein the second mode is an up-conversion mode for increasing a sampling rate of the downlink signal.

8. A base station in a wireless communication system employing a time division duplex (TDD) scheme, the base station comprising:

a controller comprising a sampling rate conversion circuit, wherein the controller is configured to:
in case that a timing advance (TA) value with respect to an uplink signal to be transmitted from a terminal is larger than a sum of a processing time of the uplink signal and a processing time of a downlink signal, identify a switching period for controlling a conversion mode of the sampling rate conversion circuit,
generate a switching signal within the switching period,
switch the conversion mode from a first mode to a second mode in response to the switching signal, and
change a sampling rate of the uplink signal or the downlink signal, based on the second mode.

9. The base station of claim 8, wherein the processing time of the uplink signal is a sum of a processing time of a conversion and a processing time of a reception signal, and wherein the processing time of the downlink signal is a sum of the processing time of the conversion and a processing time of a transmission signal.

10. The base station of claim 9, wherein the controller generates:
count values that increase every clock according to a clock frequency, determines at least one count value corresponding to the switching period, based on at least one of the clock frequency, the TA, the processing time, or information on configuration of a frame, and
the switching signal when at least one of the count values matches the at least one count value, wherein the count values are reset by a radio frame indicator, and wherein the radio frame indicator indicates a start time of the frame.

11. The base station of claim 9, wherein the identifying of the switching period is based on information on a configuration of a frame through which the uplink signal and the downlink signal are transmitted and received, and wherein the information on the configuration of the frame comprises information on lengths and arrangements of respective ones of an uplink transmission period, a downlink transmission period, or a guard period (GP).

12. The base station of claim 8, wherein the sampling rate conversion circuit comprises:
a filter,
a first conversion circuit operating in the first mode, and
a second conversion circuit operating in the second mode, wherein the filter receives an output of the first conversion circuit, which is received through a first connection between the first conversion circuit and the filter, or receives an output of the second conversion circuit through a second connection between the second conversion circuit and the filter, performs a filter operation on the received output, and outputs a result of the filter operation, wherein the output of the sampling rate conversion circuit is determined based on the result of the filter operation, and wherein the first connection is released and the second connection is established based on the switching signal.

13. The base station of claim 12, wherein the switching signal comprises a control signal for resetting a memory of the filter, and wherein the control signal is a signal for deleting data related to the first mode from the memory in order to perform an operation corresponding to the second mode in the filter.

14. The base station of claim 8, wherein the first mode is a down-conversion mode for reducing a sampling rate of the uplink signal, and wherein the second mode is an up-conversion mode for increasing a sampling rate of the downlink signal.

* * * * *